July 13, 1937.  J. W. DABNEY  2,086,538
VEHICULAR WHEEL BRAKE
Filed Feb. 4, 1936  3 Sheets-Sheet 1

Inventor
John W. Dabney
By Clarence A. O'Brien and
Hyman Berman Attorney

Inventor
John W. Dabney
By Clarence A. O'Brien and
Hyman Berman
Attorney

July 13, 1937.  J. W. DABNEY  2,086,538
VEHICULAR WHEEL BRAKE
Filed Feb. 4, 1936    3 Sheets-Sheet 3

Inventor
John W. Dabney

By Clarence A. O'Brien and
Hyman Berman Attorney

Patented July 13, 1937

2,086,538

UNITED STATES PATENT OFFICE 2,086,538

VEHICULAR WHEEL BRAKE

John W. Dabney, Telluride, Colo.

Application February 4, 1936, Serial No. 62,336

3 Claims. (Cl. 188—78)

This invention relates to vehicular wheel brakes and the object of the invention is to provide a brake of this character which may be employed in conjunction with either mechanical or hydraulic braking systems, and which will have more efficient braking surface than it has heretofore been possible to obtain, with a consequent increase in the braking power of the brake.

The invention together with its objects and advantages will be best understood from a study of the following description taken in connection with the accompanying drawings wherein.

Figure 1:
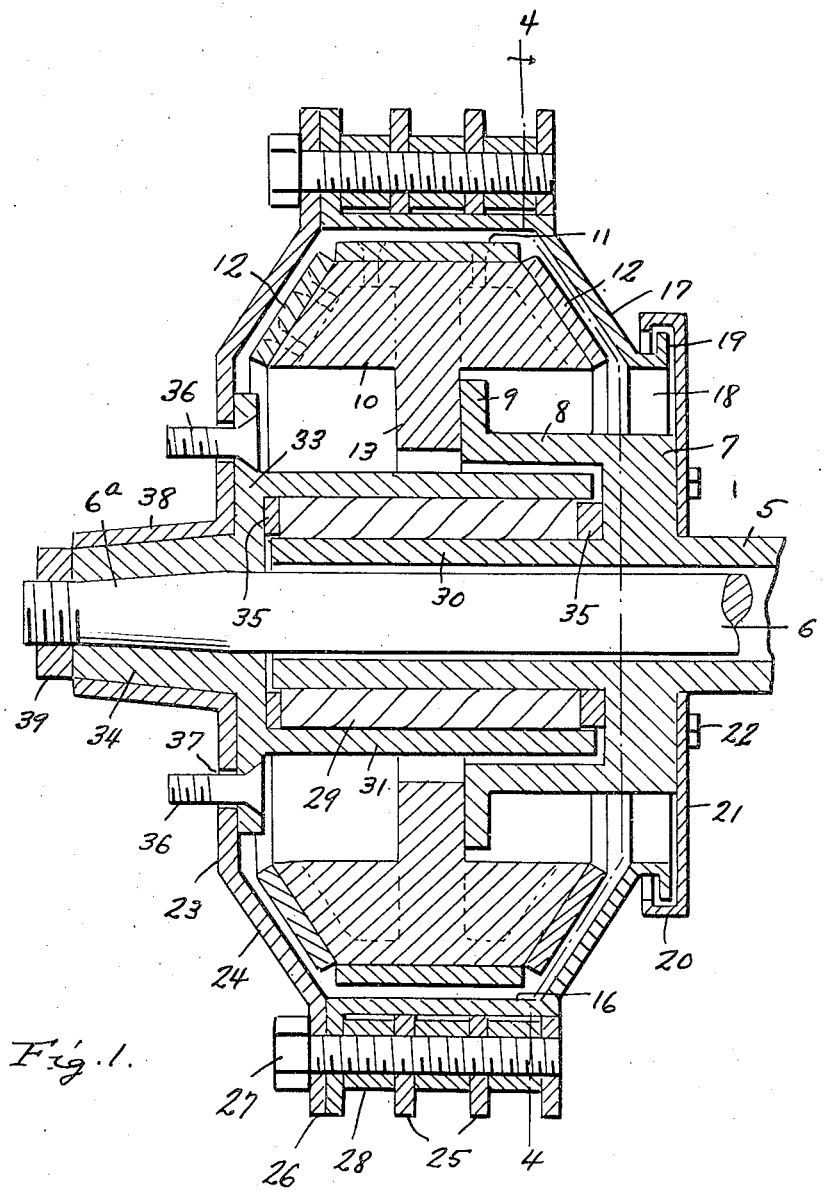
Figure 1 is a vertical sectional view showing the brake.
Figure 2:
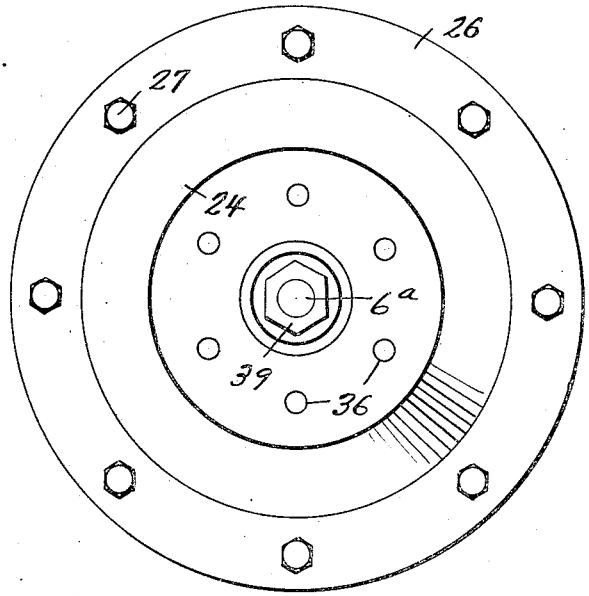
Figure 2 is an elevational view of the outboard side of the brake.

Referring to the drawings by reference numerals it will be seen that 5 indicates generally an axle housing and 6 the wheel axle.

In accordance with the present invention the housing 5 is provided with an integral collar 7 having a cylinder 8 projecting from one side thereof. At its free edge the cylinder 8 is provided with an outstanding annular flange 9.

Figure 3:
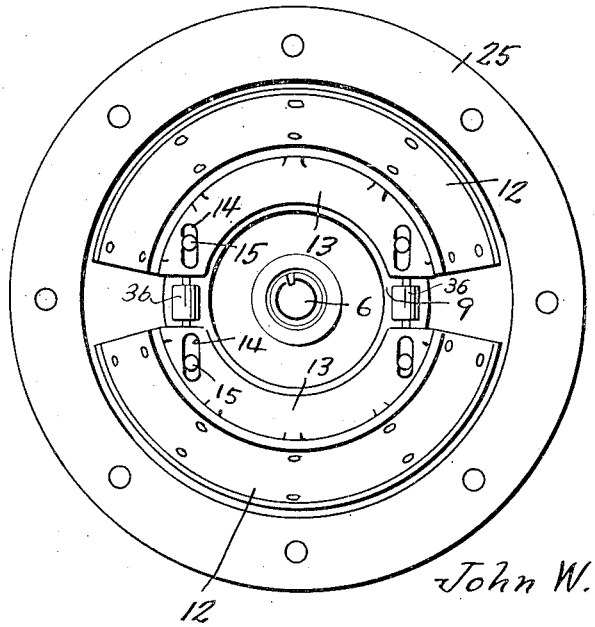
Figure 3 is an elevational view of the brake with the cover plate removed.
Figure 4:
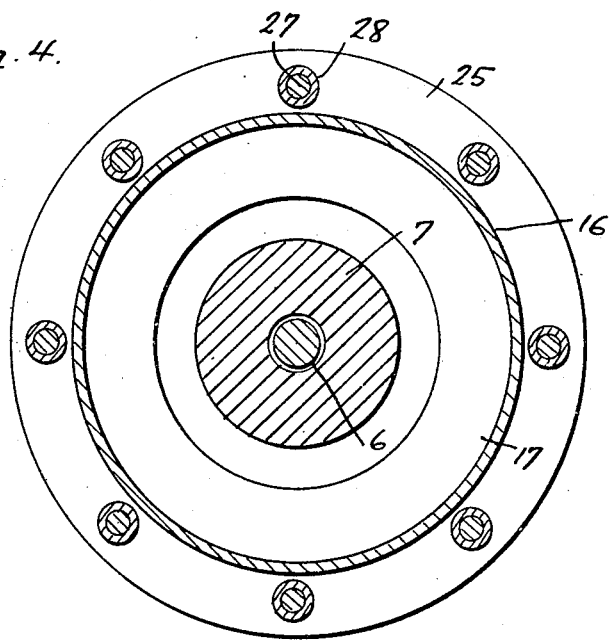
Figure 4 is a detail sectional view taken substantially on the line 4—4 of Figure 1.
Figure 5:
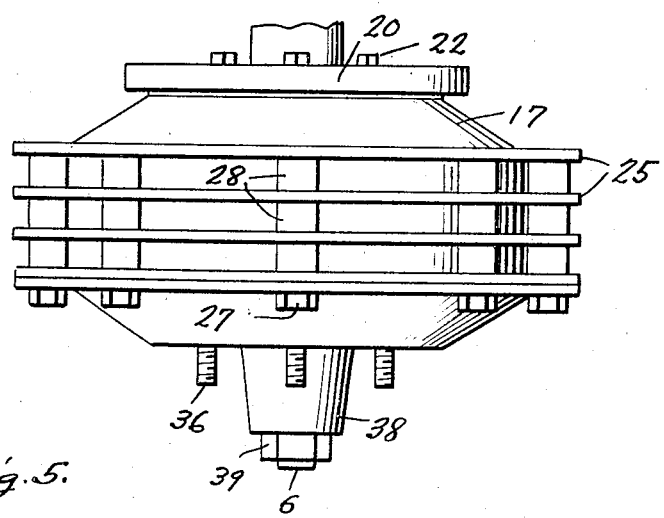
Figure 5 is a plan view of the brake.

A pair of substantially segmental braking shoes 10 are provided and these shoes which are substantially wedge-shaped in cross section are provided on their arcuate outer edges with linings 11 and on their respective side edges with linings 12 secured thereto by rivets or in any usual manner. At their inner concave edges the shoes 10 are provided with ribs 13 slotted as at 14 to receive studs 15 that project from the flange 9 as best shown in Figure 3.

A brake drum 16 has a concavo-convex end wall 17 that is provided with a flanged opening 18 and projecting outwardly from the flange of the opening 18 is a flange 19 which is loosely received within the internal groove 20 of a dust plate 21 secured by suitable fastening means 22 to the aforementioned collar 7.

For the brake drum there is also provided a removable end plate 23 that has a wall portion 24 complemental to the wall 17 of the drum and with the wall 17 and the peripheral wall 16 of the drum form three points of contact with which are engageable the linings 12 and 11 on the brake shoes 10 when the shoes are moved outwardly relative to one another into engagement with the brake drum for applying a braking action to the vehicular wheel.

Brake drum 16 has a series of circular flanges 25 on its outer periphery and these flanges are apertured as is the flange 26 of the end plate 23 to receive bolts 27 through the medium of which the plate 23 is secured in place on the brake drum. Arranged on the bolts 27 between the flanges 25 are spacers 28 as clearly shown.

Arranged within the brake drum and disposed about the axle housing 5 are anti-friction rollers 29 the inner race for which rollers is indicated by the reference numeral 30 and is formed by an extension of the axle housing 5; while the outer race 31 for said rollers projects inwardly from a plate 32 formed on one end of a hub 33 that is axially bored to receive the tapered end 6a of the wheel axle 6. Also the rollers 29 are confined between suitable bearing rings 34 and 35 respectively.

The assembly is retained in position through the medium of a nut 36 threaded on the free end of the axle 6 and the vehicular wheel is secured to the plate 33 through the medium of suitable stud bolts 36 carried by the plate 33 and extending through suitable apertures 37 provided therefor in plate 23 which latter plate is also provided with a tapered hub 38 that conformably fits about the hub 34.

From the above it will be apparent that plate 33, plate 23 and the brake drum all rotate with the wheel. Through suitable mechanism connected with the brake shoes 10 the latter are caused to move radially outwardly with respect to one another so as to engage the surfaces 11 and 12 thereof with the drum 16 and the wall sections 17 and 24 for applying a braking action to the vehicular wheel.

It will be apparent that a vehicular wheel brake of this character may be used in connection with either mechanical or hydraulic brake systems and will provide for effectively applying a braking action to the wheel, the internal expanding means 36 for the brake shoes being of any suitable construction and not forming an essential part of the present invention.

Having thus described the invention, what is claimed as new is:

1. In a vehicular wheel brake, the combination of an axle housing, a wheel axle extending therethrough, said axle housing having a fixed collar thereon, a tubular member projecting from one side of said collar and provided at its free edge with an outstanding flange, a pair of oppositely disposed brake shoes having ribs on their inner concave edges, pin and slot means operatively connecting the ribs of the shoes with said flange, a hub member mounted on said axle and provided at its inner end with a plate, a tubular member projecting from one side of said plate and terminating within the first named tubular member, the said named tubular member being disposed concentric to the axle housing, and roller bearings interposed between said axle housing and the second named tubular member; a brake drum housing the brake shoes, said brake drum having a plate secured to said hub flange by the same means for securing a vehicular wheel thereto.

2. In a vehicular wheel brake, the combination of an axle housing, a wheel axle extending therethrough, said axle housing having a fixed collar thereon, a tubular member projecting from one side of said collar and provided at its free edge with an outstanding flange, a pair of oppositely disposed brake shoes having ribs on their inner concave edges, pin and slot means operatively connecting the ribs of the shoes with said flange, a hub member mounted on said axle and provided at its inner end with a plate, a tubular member projecting from one side of said plate and terminating within the first named tubular member, the said named tubular member being disposed concentric to the axle housing, roller bearings interposed between said axle housing and the second named tubular member; a brake drum housing the brake shoes, said brake drum having a plate secured to said hub flange by means used for securing a vehicular wheel thereto, said drum at the end thereof remote to the first named end plate being provided with a second end plate having a flange opening disposed in spaced concentric relation to said collar, and said shoes and said drum and end plates being complementarily shaped whereby when said shoes are moved outwardly for applying a braking action to the vehicular wheel the sides of said shoes will engage said end plates and the outer arcuate edges of said shoes will engage the peripheral wall of said drum to provide maximum braking surface.

3. In a vehicular wheel brake, the combination of an axle housing, a wheel axle extending therethrough, said axle housing having a fixed collar thereon, a tubular member projecting from one side of said collar and provided at its free edge with an outstanding flange, a pair of oppositely disposed brake shoes having ribs on their inner concave edges, pin and slot means operatively connecting the ribs of the shoes with said flange, a hub member mounted on said axle and provided at its inner end with a plate, a tubular member projecting from one side of said plate and terminating within the first named tubular member, the said named tubular member being disposed concentric to the axle housing, roller bearings interposed between said axle housing and the second named tubular member; a brake drum housing the brake shoes, said brake drum having a plate secured to said hub flange by means securing a vehicular wheel thereto, said drum at the end thereof remote to the first named end plate being provided with a second end plate having a flange opening disposed in spaced concentric relation to said collar, and said shoes and said drum and end plates being complementarily shaped whereby when said shoes are moved outwardly for applying a braking action to the vehicular wheel the sides of said shoes will engage said end plates and the outer arcuate edges of said shoes will engage the peripheral wall of said drum to provide maximum braking surface, a dust plate secured to said collar and provided with an annular flange equipped with an internal groove, and the second named end plate of said drum at the opening therein having a flange portion loosely engaging in the last named groove.

JOHN W. DABNEY.